(12) United States Patent
Athreya et al.

(10) Patent No.: US 12,498,873 B2
(45) Date of Patent: Dec. 16, 2025

(54) SYSTEM AND METHODS FOR DRAM-LESS GARBAGE COLLECTION WITH IMPROVED PERFORMANCE

(71) Applicant: SK Hynix NAND Product Solutions Corp., Rancho Cordova, CA (US)

(72) Inventors: Arun Athreya, Folsom, CA (US); Yihua Zhang, Folsom, CA (US); Shankar Natarajan, Folsom, CA (US); Parth Donga, Folsom, CA (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 224 days.

(21) Appl. No.: 18/223,445

(22) Filed: Jul. 18, 2023

(65) Prior Publication Data
US 2025/0028473 A1    Jan. 23, 2025

(51) Int. Cl.
G06F 3/06    (2006.01)

(52) U.S. Cl.
CPC .......... *G06F 3/0652* (2013.01); *G06F 3/0604* (2013.01); *G06F 3/064* (2013.01); *G06F 3/0673* (2013.01)

(58) Field of Classification Search
CPC ...... G06F 3/0652; G06F 3/0604; G06F 3/064; G06F 3/0673
See application file for complete search history.

(56) References Cited

U.S. PATENT DOCUMENTS

| | | | | |
|---|---|---|---|---|
| 7,610,437 B2 * | 10/2009 | Sinclair | ................ | G06F 3/0652 |
| | | | | 711/104 |
| 7,984,084 B2 * | 7/2011 | Sinclair | ............... | G06F 16/1847 |
| | | | | 707/818 |
| 8,285,918 B2 * | 10/2012 | Maheshwari | ........ | G11C 7/1072 |
| | | | | 711/159 |
| 8,443,263 B2 * | 5/2013 | Selinger | ............. | G06F 11/1068 |
| | | | | 714/768 |
| 8,873,284 B2 * | 10/2014 | Sinclair | ............... | G06F 12/0246 |
| | | | | 365/185.11 |
| 9,223,693 B2 * | 12/2015 | Sinclair | ............... | G06F 12/0246 |

(Continued)

FOREIGN PATENT DOCUMENTS

| | | | | |
|---|---|---|---|---|
| CN | 100585570 C | * | 1/2010 | ........... G06F 3/0659 |
| CN | 103389942 A | * | 11/2013 | ......... G06F 12/0246 |
| EP | 1914990 A1 | * | 4/2008 | ............. G06F 21/85 |

*Primary Examiner* — Christopher D Birkhimer
(74) *Attorney, Agent, or Firm* — Haley Guiliano LLP

(57) ABSTRACT

A system and related method, including system memory with a source memory block and a destination memory block each of a memory block size, a first volatile memory and a second volatile memory, each of a volatile memory size. The system includes processing circuitry to receive a garbage collection request associated with the destination memory block. The processing circuitry then determines whether the memory block size is greater than the volatile memory size and pauses data change operations but allows for passive operations to continue. While data change operations are paused the processing circuitry loads a first portion of data of the source memory block to the first volatile memory and a second portion of the data to the second volatile memory. The processing circuitry writes each portion of data from the volatile memory to the destination memory block to complete garbage collection and unpauses the data change operations.

20 Claims, 5 Drawing Sheets

(56) References Cited

U.S. PATENT DOCUMENTS

| | | | |
|---|---|---|---|
| 9,336,133 B2* | 5/2016 | Sinclair | G06F 12/0246 |
| 9,348,746 B2* | 5/2016 | Sinclair | G06F 12/0246 |
| 9,465,731 B2* | 10/2016 | Sinclair | G06F 12/0246 |
| 9,652,382 B1* | 5/2017 | Subramanian | G06F 12/0253 |
| 9,734,050 B2* | 8/2017 | Sinclair | G06F 12/0253 |
| 9,734,911 B2* | 8/2017 | Sinclair | G06F 3/0658 |
| 9,778,855 B2* | 10/2017 | Sinclair | G06F 3/064 |
| 9,996,268 B2 | 6/2018 | Nishikubo et al. | |
| 10,108,543 B1* | 10/2018 | Duggal | G06F 11/14 |
| 10,108,544 B1* | 10/2018 | Duggal | G06F 11/14 |
| 10,120,613 B2* | 11/2018 | Sinclair | G06F 12/02 |
| 10,133,490 B2* | 11/2018 | Sinclair | G06F 3/0655 |
| 10,255,179 B2* | 4/2019 | Ji | G06F 3/0659 |
| 10,430,279 B1* | 10/2019 | Dittia | G06F 3/0656 |
| 10,558,567 B1* | 2/2020 | Givargis | G06F 12/0276 |
| 10,739,996 B1* | 8/2020 | Ebsen | G06F 16/1727 |
| 10,795,812 B1* | 10/2020 | Duggal | G06F 3/067 |
| 10,983,715 B2* | 4/2021 | Sharoni | G06F 21/79 |
| 11,086,537 B2* | 8/2021 | Byun | G06F 12/0253 |
| 11,537,513 B2* | 12/2022 | Kim | G06F 12/0253 |
| 2007/0033325 A1* | 2/2007 | Sinclair | G06F 3/0608 |
| | | | 711/170 |
| 2008/0082596 A1* | 4/2008 | Gorobets | G06F 12/0253 |
| 2008/0189477 A1* | 8/2008 | Asano | G06F 12/0246 |
| | | | 711/E12.008 |
| 2011/0145473 A1* | 6/2011 | Maheshwari | G11C 7/1072 |
| | | | 711/E12.008 |
| 2011/0161784 A1* | 6/2011 | Selinger | G06F 11/1016 |
| | | | 714/E11.002 |
| 2012/0005406 A1 | 1/2012 | Hutchison et al. | |
| 2012/0072654 A1 | 3/2012 | Olbrich et al. | |
| 2013/0304972 A1* | 11/2013 | Aso | G06F 12/0246 |
| | | | 711/103 |
| 2014/0325148 A1* | 10/2014 | Choi | G06F 3/0659 |
| | | | 711/114 |
| 2014/0365719 A1* | 12/2014 | Kuzmin | G06F 12/0246 |
| | | | 711/103 |
| 2015/0227602 A1* | 8/2015 | Ramu | G06F 11/1456 |
| | | | 707/634 |
| 2016/0246713 A1* | 8/2016 | Choi | G06F 3/0608 |
| 2017/0123655 A1* | 5/2017 | Sinclair | G06F 3/061 |
| 2017/0123975 A1* | 5/2017 | Tseng | G06F 12/0269 |
| 2017/0242790 A1* | 8/2017 | O'Krafka | G06F 3/0652 |
| 2018/0089088 A1* | 3/2018 | Jakowski | G06F 12/0804 |
| 2018/0189175 A1* | 7/2018 | Ji | G06F 3/0679 |
| 2018/0349234 A1* | 12/2018 | Liu | G06F 11/3055 |
| 2020/0089420 A1* | 3/2020 | Sharoni | G06F 21/79 |
| 2020/0192794 A1* | 6/2020 | Lee | G06F 3/0653 |
| 2020/0218653 A1* | 7/2020 | Ryu | G06F 12/0253 |
| 2020/0226062 A1 | 7/2020 | Hsu et al. | |
| 2020/0310686 A1* | 10/2020 | Truong | G06F 3/061 |
| 2021/0216447 A1 | 7/2021 | Fu | |
| 2021/0294737 A1* | 9/2021 | Wang | G06F 12/0822 |
| 2021/0342362 A1* | 11/2021 | Haravu | G06F 11/1464 |
| 2021/0389904 A1* | 12/2021 | Lee | G06F 3/0679 |
| 2021/0406216 A1* | 12/2021 | Komatsu | G06F 16/11 |
| 2023/0281120 A1* | 9/2023 | Reuter | G06F 3/0679 |
| | | | 707/813 |
| 2024/0202114 A1* | 6/2024 | Tang | G06F 12/0246 |

* cited by examiner

US 12,498,873 B2

SYSTEM AND METHODS FOR DRAM-LESS GARBAGE COLLECTION WITH IMPROVED PERFORMANCE

TECHNICAL FIELD

The present disclosure is directed to systems and methods for performing garbage collection within storage devices.

SUMMARY

In accordance with the present disclosure, systems and methods are provided for garbage collection in a storage system without Dynamic Random Access Memory (DRAM). The DRAM-less storage system may include system memory having memory blocks of memory block size and volatile memory of volatile memory size, where the memory block size is larger than the volatile memory size. The system and methods disclosed herein enable garbage collection of memory blocks which are of a larger size than the volatile memory, while processing circuitry of the storage system is able to process passive operations, such as read operations. The system may receive garbage collection requests indicating a destination address of a destination memory block to be cleared. The system is to clear any invalid or stale destination data stored at the destination address by overwriting the destination data of system memory with valid source data from the source memory block. The system and methods disclosed herein uses volatile memory to temporarily store portions of source data to overwrite invalid or stale destination data indicated by garbage collection request. This improves the overall bandwidth and efficiency of the processing circuitry of the storage device (e.g. a solid-state drive (SSD) device) during the process of garbage collection.

In some embodiments, the system (e.g., a storage device) is provided with a system memory, volatile memory, and processing circuitry that are communicatively coupled to each other. In some embodiments, the processing circuitry receives garbage collection requests indicating invalid or stale data to be cleared or overwritten. In some embodiments, the processing circuitry loads at least two portions of valid source data to volatile memory, the at least two portions of source data to be used to overwrite invalid destination data stored in the system memory. The garbage collection request received by the processing circuitry includes a destination address which corresponds to destination data that is to be cleared by garbage collection.

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, and/or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

DETAILED DESCRIPTION

Figure 1:
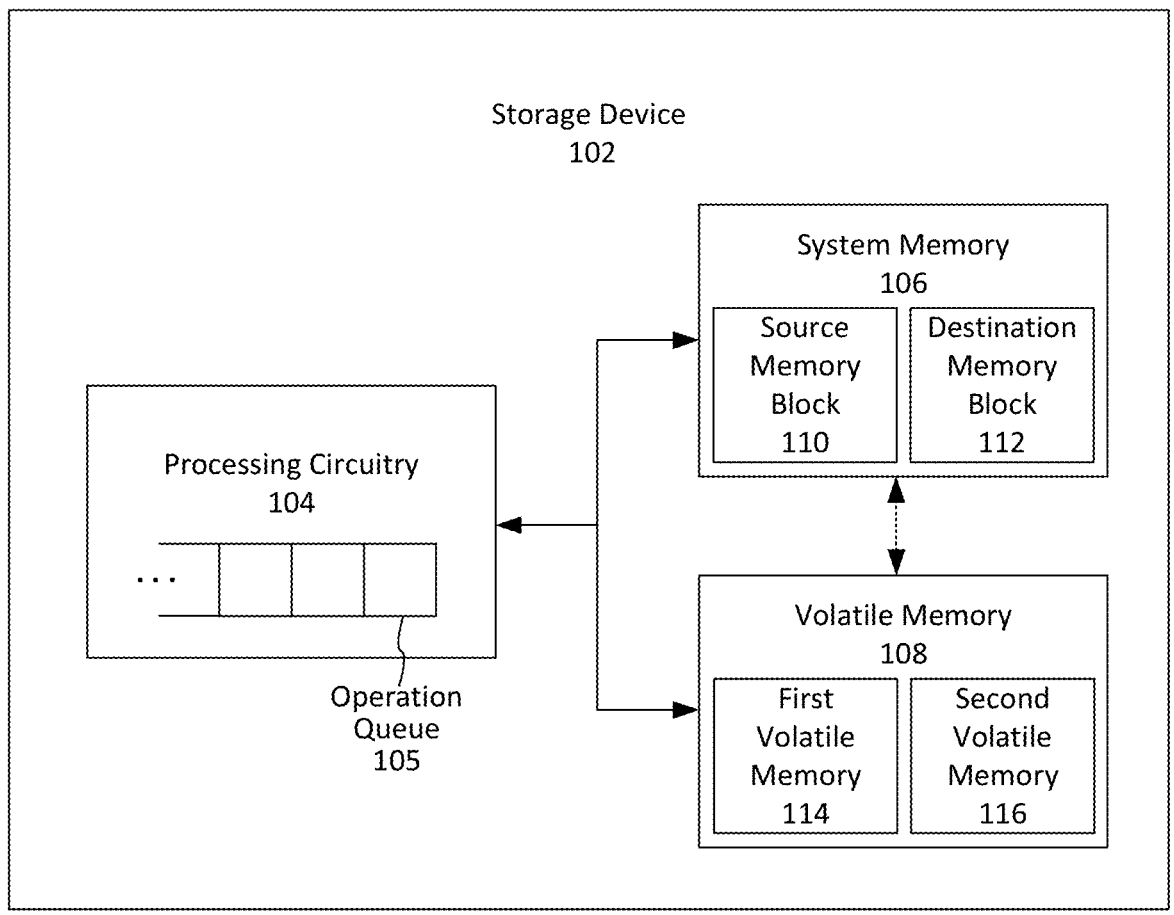
FIG. 1 shows an illustrative diagram of a storage device with processing circuitry, system memory, and volatile memory, in accordance with some embodiments of the present disclosure.

In accordance with the present disclosure, systems and method are provided for garbage collection in a storage system (e.g., an SSD device) without Dynamic Random Access Memory (DRAM). An SSD device may receive garbage collection requests and perform garbage collection on data corresponding to a destination address of destination memory block in the system memory. Garbage collection may clear destination data stored at the destination address. However, the destination data may also be overwritten by other data (e.g., source data of the source memory block). For example, the processing circuitry of a DRAM-less storage system may load valid source data of the source memory block to volatile memory to temporarily store the source data before overwriting the invalid destination data that is subject to garbage collection. In a DRAM-less storage systems, the memory block size of each memory block (e.g., source memory block and destination memory block) is larger than a volatile memory size of volatile memory (e.g., a first volatile memory and a second volatile memory). In such a system, the processing circuitry loads a first portion and a second portion of source data to the first volatile memory and the second volatile memory. This process occurs while data change operations (e.g., write operations) are held from being processed by the processing circuitry.

In some embodiments, the processing circuitry may initially receive a garbage collection request associated with the destination memory block of the system memory. Garbage collection requests are used to indicate portions of or whole memory blocks of the system memory which are to be overwritten or removed due to stale or invalid data. The processing circuitry then determines whether the memory block size of the memory blocks (e.g., the source memory block and the destination memory block) is greater than the volatile memory size of the volatile memory (e.g., the first volatile memory and the second volatile memory). When the memory block size is greater than the volatile memory size, the processing circuitry pauses the data change operations (e.g., write operations) that were previously queued by the processing circuitry, but allows for passive operations (e.g., read operations and error handling operations) to continue to be processed by the processing circuitry. Data change operations are stalled during the garbage collection process in order to avoid any data involved in the garbage collection process (e.g., data associated with the source memory block) from being unexpectedly modified. However, passive operations, such as read operations, should not cause any issues during the garbage collection process. Due to the large memory block size, the source data is divided into at least two portions (e.g., a first portion of data and a second portion of data) and loaded to at least two volatile memory (e.g., the first volatile memory and the second volatile memory). Volatile memory may be used to temporarily store the portions of data due to the fast read time attributes of volatile memory. Once the portions of source data are loaded to the volatile memory, the processing circuitry writes each of the first portion of data from the first volatile memory and the second portion of data from the second volatile memory to the destination memory block to complete the garbage collection process. Finally, once the garbage collection process for the destination memory block is complete the processing circuitry unpauses the data change operations and proceeds to process the write operations that have been queued by the processing circuitry since the start of the most recent garbage collection process.

In some embodiments, the system memory of the system disclosed herein may contain any of the following memory densities: single-level cells (SLCs), multi-level cells (MLCs), triple-level cells (TLCs), quad-level cells (QLCs), penta-level cells (PLCs), and any suitable memory density that is greater than five bits per memory cell. In some embodiments, the system memory includes at least two memory blocks.

For purposes of brevity and clarity, the features of the disclosure described herein are in the context of an SSD having processing circuitry, volatile memory, and system memory. However, the principles of the present disclosure may be applied to any other suitable context in which garbage collection of a DRAM-less system is used. A storage device may include processing circuitry, volatile memory, and system memory and the processing circuitry, volatile memory and system memory are communicatively coupled to each other by network buses or interfaces. In some embodiments, the processing circuitry receives requests or operations, which may be driven on a network bus or interface from a source outside of the storage device or may be transmitted from within the storage device (e.g., from system memory).

In particular, the present disclosure provides systems and methods that partitions source data into at least two portions of data to temporarily store the source data in at least two volatile memory to perform garbage collection in a DRAM-less storage system. The systems and methods leverage pausing data change operations, such as write operations, from being processed by the processing circuitry while allowing passive operations (e.g., read operations and error handling operations) to continue during garbage collection. This improves the overall throughput of the storage system while the processing circuitry processes the garbage collection of invalid or stale data.

In some embodiments, a processor of the processing circuitry may be a highly parallelized processor capable of handling high bandwidths of incoming data quickly (e.g., by starting simultaneous processing of instructions before completion of previous instructions).

In some embodiments the system and methods of the present disclosure may refer to a storage device system (e.g., an SSD storage system), which includes a storage device such as a solid-state drive device, which is communicatively coupled to the processing circuitry by a network bus or interface.

An SSD is a data storage device that uses integrated circuit assemblies as memory to store data persistently. SSDs have no moving mechanical components, and this feature distinguishes SSDs from traditional electromechanical magnetic disks, such as, hard disk drives (HDDs) or floppy disks, which contain spinning disks and movable read/write heads. Compared to electromechanical disks, SSDs are typically more resistant to physical shock, run silently, have lower access time, and less latency.

Many types of SSDs use NAND-based flash memory which retain data without power and include a type of non-volatile storage technology. Quality of Service (QOS) of an SSD may be related to the predictability of low latency and consistency of high input/output operations per second (IOPS) while servicing read/write input/output (I/O) workloads. This means that the latency or the I/O command completion time needs to be within a specified range without having unexpected outliers. Throughput or I/O rate may also need to be tightly regulated without causing sudden drops in performance level.

The subject matter of this disclosure may be better understood by reference to FIGS. 1-5.

FIG. 1 shows an illustrative diagram of a system 100 of a storage device 102 with a processing circuitry 104, system memory 106, and volatile memory 108, in accordance with some embodiments of the present disclosure. In some embodiments, storage device 102 may be a solid-state storage device (e.g., an SSD device). In some embodiments, processing circuitry 104 may include a processor or any suitable processing unit. In some embodiments, system memory 106 may be non-volatile memory. It will be understood that the embodiments of the present disclosure are not limited to SSDs. For example, in some embodiments, the storage device 102 may include a hard disk drive (HDD) device in addition to or in place of an SSD.

In some embodiments, the processing circuitry 104 is configured to receive garbage collection requests, where the garbage collection request includes a memory address for a destination memory block of the system memory 106 on which to perform garbage collection. Garbage collection may be requested for invalid or stale data that is determined to be no longer needed by the processing circuitry 104. Garbage collection generally refers to memory management by reclaiming portions of memory that was previously allocated for presently invalid or stale data. In some embodiments, garbage collection may clear the invalid or stale data that is allocated at the memory address included in the garbage collection request. In some embodiments, garbage collection may overwrite the invalid or stale data with valid data that the processing circuitry 104 is more likely to use while executing instructions or operations. In some embodiments, the garbage collection request is transmitted on a network bus or interface to the processing circuitry 104. In some embodiments, the garbage collection request is transmitted from an external source (e.g., a host device that is communicatively coupled to the storage device 102). The processing circuitry 104 may receive garbage collection requests from both internal and external sources of the storage device 102. The processing circuitry 104 includes an operation queue 105, which his configured to temporarily store any outstanding instructions (e.g., a read instruction or write instruction) that are to be processed by the processing circuitry 104.

In some embodiments, the operation queue of the processing circuitry 104 is configured to include at least two buffers or queues, the first queue configured to temporarily store prioritized instructions (e.g. read instructions or error handling instructions) and the second queue is configured to temporarily store data change operation instructions, such as write instructions. The implementation of a prioritized queue (e.g., the first queue) enables the processing circuitry 104 to perform operations which would not interfere with the performance of an ongoing execution of garbage collection on a portion of the system memory 106. Data change operations, such as write operations, remain in the data change operation queue (e.g., the second queue) during garbage collection as to not cause writing to a memory address that is being used within the garbage collection process, which may produce unexpected result within the system memory 106.

Additionally, storage device 102 includes system memory 106. In some embodiments, system memory 106 includes any one or more of a non-volatile memory, such as Phase Change Memory (PCM), a PCM and switch (PCMS), a Ferroelectric Random Access Memory (FeRAM), or a Ferroelectric Transistor Random Access Memory (FeTRAM), a Memristor, a Spin-Transfer Torque Random Access Memory (STT-RAM), and a Magnetoresistive Random Access Memory (MRAM), any other suitable memory, or any combination thereof. In some embodiments, system memory 106 includes a source memory block 110 containing source data at a source address and a destination memory block 112 containing destination data at a destination address. The destination memory block 112 is the memory block on which garbage collection is to be performed, and the source memory block 110 contains source data with which the processing circuitry 104 uses to overwrite the invalid destination data of the destination memory block 112. In some embodiments, processing circuitry 104 is communicatively coupled to system memory 106, in order to store and access data corresponding to memory blocks (e.g., source memory block 110 and destination memory block 112). In some embodiments, a data bus interface is used to transport garbage collection requests or data associated garbage collection. The data bus between the system memory 106 and processing circuitry 104 provides a network bus for accessing or writing of data to system memory 106 (e.g., any memory block of system memory 106).

Storage device 102 also includes volatile memory 108. In some embodiments, volatile memory 108 includes any one or more of a volatile memory, such as Static Random Access Memory (SRAM). In some embodiments, volatile memory 108 includes at least a first volatile memory 114 and a second volatile memory 116, each configured to temporarily stores data (e.g. source data) during execution of operations by the processing circuitry 104. In some embodiments, processing circuitry 104 is communicatively coupled to volatile memory 108, in order to store and access data corresponding to the volatile memory (e.g., first volatile memory 114 and the second volatile memory 116). In some embodiments, a data bus interface is used to transport data associated garbage collection between the system memory 106 and the volatile memory 108. The data bus between the system memory 106 and volatile memory 108 provides a network bus for accessing or writing of data to or from the system memory 106 (e.g., source memory block 110 and destination memory block 112).

In some embodiments, the processor or processing unit of processing circuitry 104 may include a hardware processor, a software processor (e.g., a processor emulated using a virtual machine), or any combination thereof. The processor, also referred to herein as processing circuitry 104, may include any suitable software, hardware, or both for controlling the system memory 106 and the processing circuitry 104. In some embodiments, the storage device 102 may further include a multi-core processor. System memory 106 may also include hardware elements for non-transitory storage of instructions, commands, or requests.

The processing circuitry 104 is configured to perform garbage collection for the DRAM-less storage device 102 by partitioning data from the source memory block 110 into multiple groups or portions. Initially, the processing circuitry 104 may receive a garbage collection request associated with the destination memory block 112. Once the processing circuitry 104 receives the garbage collection request, the processing circuitry 104 determines whether the memory block size of the system memory 106 is greater than the volatile memory size of the volatile memory 108. When the memory block size is greater than the volatile memory size, the source data of the source memory block 110 must be partitioned into at least two portions (e.g., a first portion of data and a second portion of data) in order to be loaded to at least two volatile memory (e.g., the first volatile memory 114 and second volatile memory 116). The processing circuitry 104 is further configured to pause the execution of any data change operations queued by the processing circuitry 104 in operation queue 105, while allowing for read operations and error handling operations to continue to be executed. In some embodiments, the processing circuitry 104 loads the first portion of data to the first volatile memory 114 and the second portion of data to the second volatile memory 116. The disclosed garbage collection in a DRAM-less storage device 102 herein will ensure that the processing circuitry 104 is able to process instructions of operations that will not cause any unexpected changes to the data of the system memory 106 during the garbage collection, such as read operations and error handling operations. This process improves the operation bandwidth of the processing circuitry 104 during garbage collection in DRAM-less storage devices (e.g. storage device 102).

Storage devices (for example, SSD devices) may include one or more packages of memory dies (e.g., system memory 106), where each die includes storage cells. In some embodiments, the storage cells are organized into pages, and pages are organized into blocks, such as the source memory block 110 and the destination memory block 112. Each storage cell can store one or more bits of information.

It will be understood that, while system 100 depicts an embodiment in which a DRAM-less storage device (e.g., storage device 102) is configured to have capabilities for performing garbage collection with improved bandwidth for read operations and error handling operations during garbage collection in accordance with the present disclosure, any other suitable device may be implemented in a similar manner.

For purposes of clarity and brevity, and not by way of limitation, the present disclosure is provided in the context of performing garbage collection with improved bandwidth for passive operations (e.g., read operations, error handling operations) during garbage collection, which provides the features and functionalities disclosed herein. The process of performing garbage collection with improved bandwidth for passive operations may be configured by any suitable software, hardware, or both for implementing such features and functionalities. Performing garbage collection, as disclosed, may be at least partially implemented in, for example, storage device 102 (e.g., as part of processing circuitry 104, or any other suitable device). For example, for a solid-state storage device (e.g., storage device 102), garbage collection with improved bandwidth for read operations and error handling operations may be implemented in processing circuitry 104.

Figure 2:
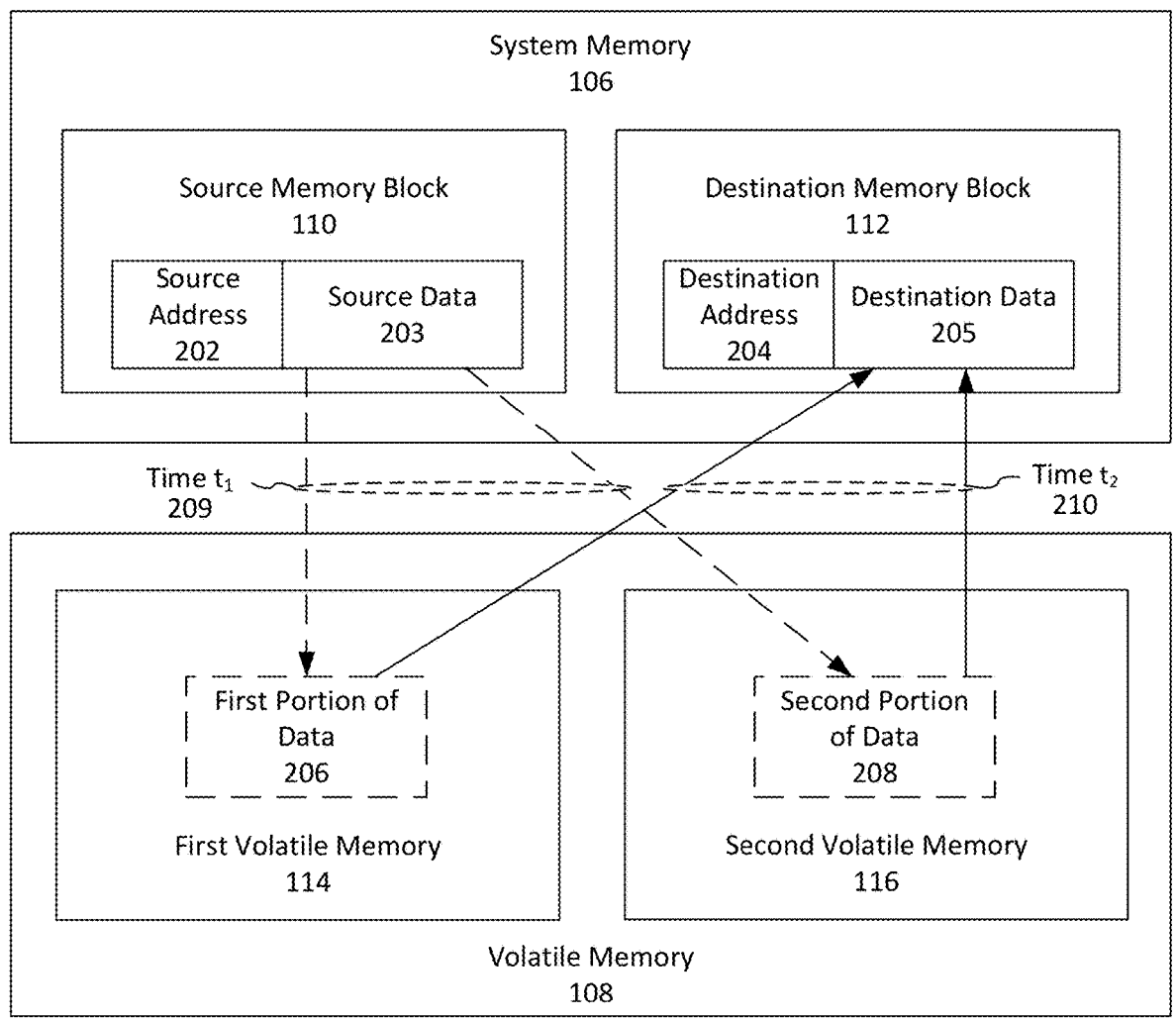
FIG. 2 shows an illustrative diagram that shows a process to transfer source data from a source memory block to a destination memory block, in accordance with some embodiments of the present disclosure.

FIG. 2 shows an illustrative diagram that shows a process 200 to transfer source data 203 from a source memory block 110 to a destination memory block 112, in accordance with some embodiments of the present disclosure. The source memory block 110 includes source data 203, which is stored at source address 202. The destination memory block 112 includes destination data 205 stored at destination address 204.

At time $t_1$ 209, the processing circuitry 104 loads a first portion of data 206 associated with the source memory block to the first volatile memory 114 and a second portion of data 208 associated with the source memory block to the second volatile memory 116. The source data 203 at the source address 202 is partitioned into at least two portions due to the large size of the memory blocks (e.g., source memory block 110 and destination memory block 112) of the system memory 106 compared to the volatile memory size of each of the first volatile memory 114 and the second volatile memory 116. In some embodiments, the source data 203 may be partitioned in more than two portions of data, for example three portions of data associated with the source data 203. In such an example, the processing circuitry 104 loads the third portion of data associated with the source data 203 to a third volatile memory (not shown in FIG. 2).

In some embodiments, the first portion of the data 206 is loaded onto the first volatile memory 114 and the second portion of the data 208 is loaded onto the second volatile memory 116 while data change operations (e.g., write operations) are held at the operation queue 105. During this initial phase of garbage collection, passive operations may be processed alongside the load operations of the first portion of data 206 and the second portion of data 208. For example, a read operation may be processed by the processing circuitry in order to read at a memory address in the system memory, including the source address 202 and the destination address 204. The use of the first volatile memory 114 and the second volatile memory 116 as intermediary memory allocation allows for passive operations to continue to be processed without affecting the data stored within the system memory 106. After the processing circuitry 104 loads the first portion of data 206 associated with the source memory block 110 to the first volatile memory 114 and the second portion of data 208 associated with the source memory block 110 to the second volatile memory 116, the processing circuitry 104 writes the first portion of data 206 and the second portion of data 208 to the destination memory block 112.

At time $t_2$ 210, the processing circuitry 104 writes each of the first portion of data 206 associated with the source memory block 110 from the first volatile memory 114 and the second portion of data 208 associated with the source memory block 110 from the second volatile memory 116 to the destination address 204 to complete garbage collection. In some embodiments, the processing circuitry overwrites the destination data 205 at the destination address 204 with the first portion of data 206 and the second portion of data 208 associated with the source data 203. In some embodiments, the destination data 205 contains invalid or stale data. When the invalid or stale destination data 205 is overwritten with the source data 203, the process of garbage collection is complete. In some embodiments, passive operations (e.g., read operations and error handling operations) continue to be processed by the processing circuitry at time $t_2$ 210. Once the processing circuitry writes the first portion of data 206 and the second portion of data 208 to the destination memory block 112 to complete garbage collection the processing circuitry 104 then unpauses the outstanding data change operations held in the operation queue 105.

In some embodiments, a data bus memory interface is used to transport each of the first portion of data 206 and the second portion of data 208 associated with the source data 203 between the system memory 106 and the volatile memory 108. The data bus memory interface between the system memory 106 and the volatile memory 108 provides a memory network bus for accessing or writing of data within the system memory 106 and the volatile memory 108.

In some embodiments, system memory 106 includes any one or more of a non-volatile memory, such as Phase Change Memory (PCM), a PCM and switch (PCMS), a Ferroelectric Random Access Memory (FeRAM), or a Ferroelectric Transistor Random Access Memory (FeTRAM), a Memristor, a Spin-Transfer Torque Random Access Memory (STT-RAM), and a Magnetoresistive Random Access Memory (MRAM), any other suitable memory, or any combination thereof. In some embodiments, volatile memory may include separate caches or other suitable volatile memory 108 to temporarily store data before they are written to the system memory 106. In some embodiments, system memory 106 may also include hardware elements for non-transitory storage of instructions, commands, or requests.

Figure 3:
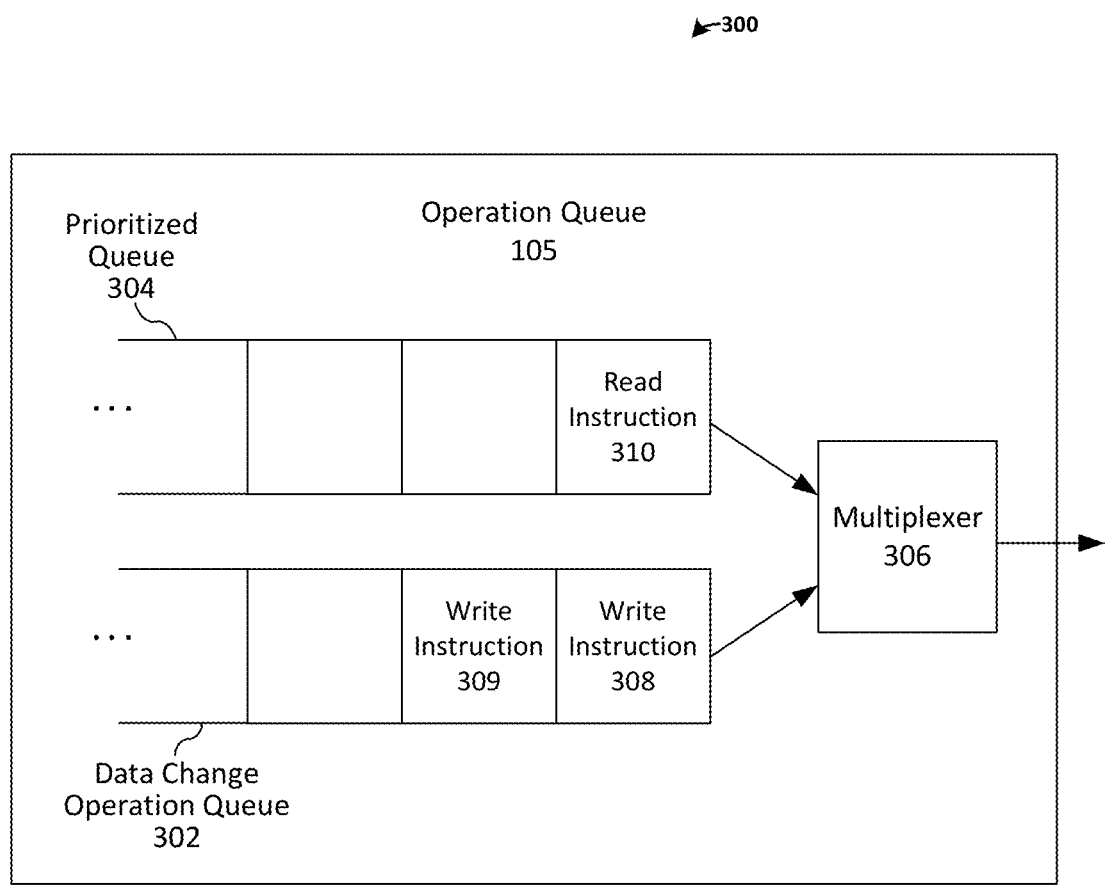
FIG. 3 show illustrative diagrams of an operation queue of FIG. 1, in accordance with some embodiments of the present disclosure.

FIG. 3 show illustrative diagrams of an operation queue 105 of FIG. 1, in accordance with some embodiments of the present disclosure. In some embodiments, the operation queue 105 may be located within the processing circuitry 104 or located elsewhere in the storage device 102 and communicatively coupled to the processing circuitry 104. The operation queue is configured to store outstanding instructions that are to be processed by the processing circuitry 104.

In some embodiments, operation queue 105 includes a data change operation queue 302 and a prioritized queue 304. The data change queue 302 is configured to temporarily store data change operations such as write instructions (e.g. write instructions 308 and 309). The prioritized queue 304 is configured to temporarily store passive operations such as read instructions (e.g., a read instruction 310) and error handling instructions. In some embodiments, the operation queue 105 includes a multiplexer 306, which is configured to select an instruction to be sent to the processing circuitry 104 to be processed. In some embodiments, the multiplexer 306 selects from one of the head of the data change operations queue 302 and the head of the prioritized queue 304. The multiplexer 306 may use a select signal (e.g., a single select bit to choose between two queues) to select from which queue to send an instruction to the processing circuitry 104. In some embodiments, the operation queue 105 may include more than two queues/buffers (e.g. the data change operation queue 302 and the prioritized queue 304). In some embodiments, the operation queue 105 may include any suitable form of buffer, including stacks, queues, and/or stacks.

In addition, the operation queue 105 may include a register or latch of which a status bit may be stored. At the initialization of the garbage collection process, the processing circuitry 104 may send an interrupt signal to the operation queue 105 to modify the status bit to indicate that garbage collection is currently in progress. During garbage collection, the operation queue 105 may hold any outstanding data change operations (e.g., write instructions 308 and 309) from being selected by the multiplexer 306, while allowing passive operations (e.g. read instruction 310) to be selected by the multiplexer 306 to be sent to the processing circuitry 104.

Figure 4:
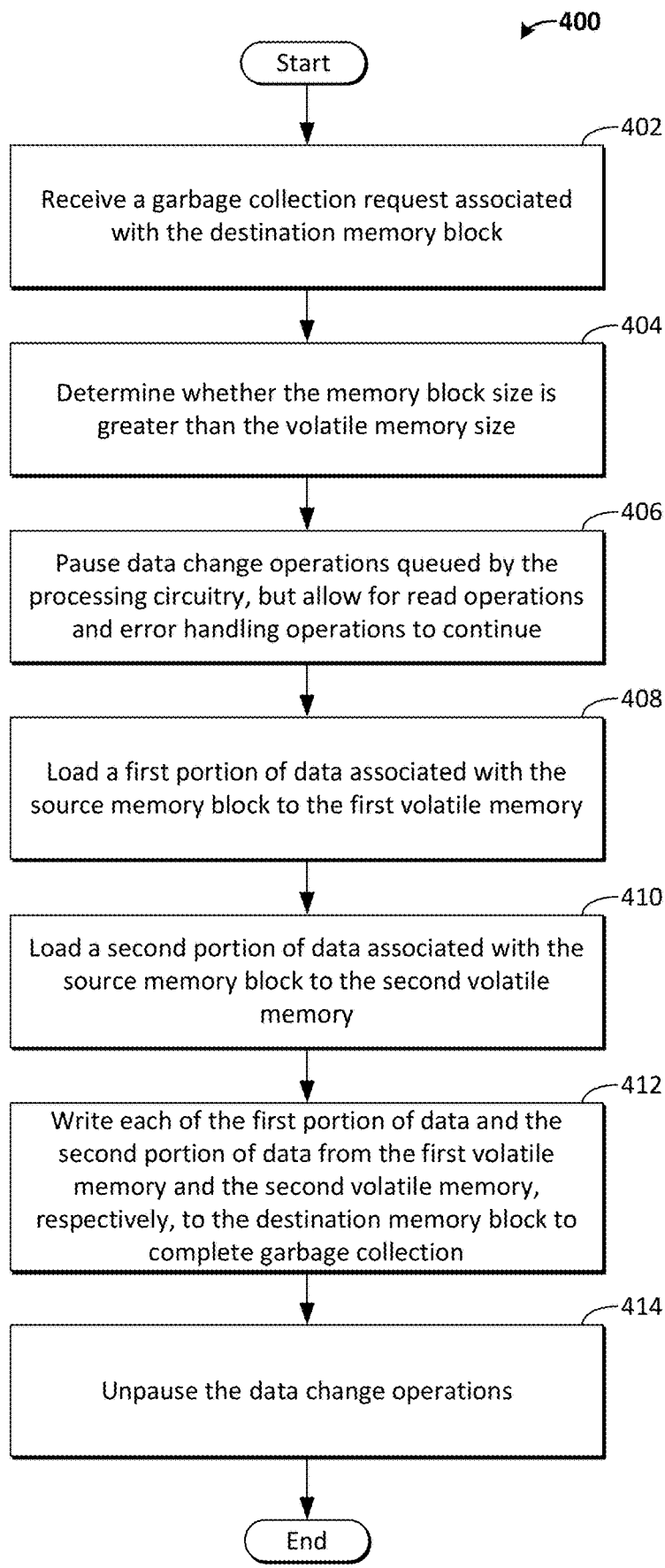
FIG. 4 shows a flowchart of illustrative steps for performing garbage collection for a DRAM-less storage device, in accordance with some embodiments of the present disclosure.

FIG. 4 shows a flowchart of illustrative steps for a process 400 of performing garbage collection for a DRAM-less storage device, in accordance with some embodiments of the present disclosure. In some embodiments, the referenced storage device, processing circuitry, operation queue, system memory, volatile memory, source memory block, destination memory block, first volatile memory, second volatile memory source data, destination data, first portion of data, and second portion of data may be implemented as storage device 102, processing circuitry 104, operation queue 105 and system memory 106, volatile memory 108, source memory block 110, destination memory block 112, first volatile memory 114, second volatile memory 116, source data 203, destination data 205, first portion of data 206, and second portion of data 208, respectively. In some embodiments, the process 400 can be modified by, for example, having steps rearranged, changed, added, and/or removed.

At step 402, the processing circuitry receives a garbage collection request associated with the destination memory block in order to remove the destination data that may be invalid or stale. Invalid data may be defined as data that is no longer needed by the processing circuitry. In some embodiments, the garbage collection request may include the destination address 204 of the destination memory block to indicate to the processing circuitry the data on which to perform garbage collection. In some embodiments, the garbage collection request is received, by the processing circuitry, from a network bus or interface. In some embodiments, the received garbage collection request is one of at least two garbage collection requests of a stream of requests. In some embodiments, the system memory may include other memory blocks and/or memory pages. In some embodiments, the storage device receives different types of requests, such as read requests, write requests, and error handling requests. At least one of the received requests may be stored in the operation queue, the volatile memory, the system memory, or any form of temporary memory. In some embodiments, the processing circuitry may include a multi-core processor which can perform garbage collection. Once the processing circuitry receives a garbage collection request the processing circuitry determines whether the memory block size is greater than the volatile memory size, at step 404.

At step 404, the processing circuitry determines whether the memory block size is greater than the volatile memory size. The memory block size is defined as the memory size of each memory block (e.g., the source memory block and the destination memory block) of the system memory. The volatile memory size is defined as the memory size of each volatile memory (e.g., the first volatile memory and the second volatile memory). In some embodiments, if the volatile memory size is greater than the memory block size, the garbage collection process would be able to load an entire memory block onto a volatile memory (e.g., the first volatile memory or the second volatile memory). When there is only one load operation to move data from the system memory to the volatile memory there is less likelihood of a data change operation (e.g., a write operation) causing an unexpected change or result in the system memory while the processing circuitry performs garbage collection. Once the processing circuitry determines that the memory block size is greater than the volatile memory size, the processing circuitry then pauses data change operations (e.g., write operations) queued by the processing circuitry, but allows passive operations (e.g., read operations and error handling operations) to continue, at step 406.

At step 406, processing circuitry pauses data change operations queued by the processing circuitry but allows for read operations and error handling operations to continue. In some embodiments, the data change operations include write operations or any other operations that change the data stored in the memory blocks (e.g., the source memory block and the destination memory block) of the system memory. In some embodiments, the processing circuitry allows any suitable passive operations, which are operations that do not change the data stored in the system memory during the garbage collection process. In some embodiments, the processing circuitry temporarily stores the data change operations (e.g., write operations) in the operation queue until the garbage collection is completed. When the processing circuitry receives a passive operation (e.g., a read operation or an error handling operation) the passive operation may bypass the operation queue to be processed by the processing circuitry during garbage collection. In some embodiments, the operation queue may include at least two buffers or queues, where a first queue stores data change operations (e.g., write operations) and a second queue stores passive operations (e.g., read operations and error handling operations). In some embodiments, the processing circuitry queues any further data change operations received during the garbage collection process. The processing circuitry may temporarily store the data change operations on any suitable volatile memory. Once the processing circuitry pauses the data change operations queued by the processing circuitry, the processing circuitry loads a first portion of data associated with the source memory block to the first volatile memory, at step 408.

At step 408, processing circuitry loads a first portion of data associated with the source memory block to the first volatile memory. The source data at the source address 202 is portioned into at least two portions due to the large size of the memory blocks of the system memory. In some embodiments, the first portion of the source data is loaded onto the first volatile memory while data change operations are held at the operation queue. During this initial phase of garbage collection, passive operations may be processed alongside the load operation. For example, a read operation may be processed by the processing circuitry in order to read at a memory address in the system memory, including the source address and the destination address. The use of the first volatile memory as an intermediary memory allocation allows for passive operations to continue to be processed without affecting the data stored within the system memory. After the processing circuitry loads a first portion of data associated with the source memory block to the first volatile memory the processing circuitry loads a second portion of data associated with the source memory block to the second volatile memory, at step 410.

At step 410, processing circuitry loads a second portion of data associated with the source memory block to the second volatile memory. Similarly to step 408, step 410 occurs while data change operations are paused from being processed by the processing circuitry and passive operations may continue to be processed by the processing circuitry. In some embodiments, the processing circuitry partitions the source data in the source memory block of the system memory into more than two portions of data. For example, the source data may be partitioned into three portions of data associated with the source memory block. In such an example, the processing circuitry is to load the third portion of data associated with the source memory block to a third volatile memory. Once the processing circuitry loads a second portion of data associated with the source memory block to the second volatile memory the processing circuitry writes each of the first portion of data from the first volatile memory and the second portion of data from the second volatile memory to the destination memory block to complete garbage collection, at step 412.

At step 412, processing circuitry writes each of the first portion of data from the first volatile memory and the second portion of data from the second volatile memory to the destination memory block to complete garbage collection. In some embodiments, the processing circuitry overwrites the destination data at the destination address 204 with the first portion of data and the second portion of data associated with the source data. When the invalid or stale destination data is overwritten with the source data, the process of garbage collection is complete. In some embodiments, passive operations (e.g., read operations and error handling operations) continue to be processed by the processing circuitry during step 412. Once the processing circuitry writes the first portion of data and the second portion of data to the destination memory block to complete garbage collection the processing circuitry unpauses the data change operations, at step 414.

At step 414, processing circuitry unpauses the data change operations (e.g., write operations) that were paused at step 406. Once garbage collection has completed, the processing circuitry may continue to modify the stored contents of the system memory by processing the outstanding data change operations from the operation queue. In some embodiments, the process 400 may repeat when the processing circuitry receives another garbage collection request to clear invalid or stale data at another destination address of another destination memory block.

Figure 5:
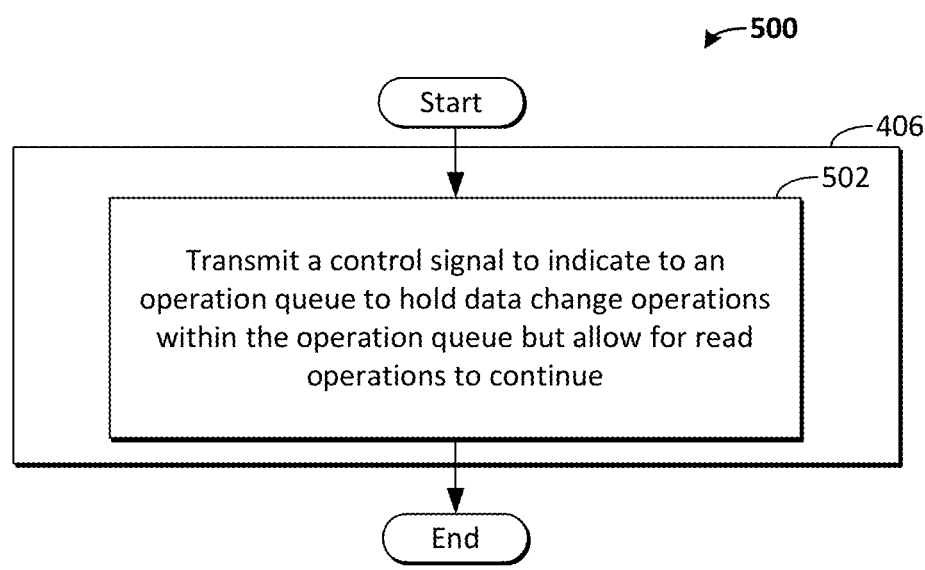
FIG. 5 shows a flowchart of illustrative steps of a subprocess for pausing data change operations queued by the processing circuitry but allowing for read operations and error handling operations to continue, in accordance with some embodiments of the present disclosure.

FIG. 5 shows a flowchart of illustrative steps of a subprocess 500 for pausing data change operations queued by the processing circuitry but allowing for read operations and error handling operations to continue (e.g., as seen in FIG. 4, at step 406), in accordance with some embodiments of the present disclosure. In some embodiments, the referenced storage device, processing circuitry, operation queue, system memory, volatile memory, source memory block, destination memory block, first volatile memory, second volatile memory source data, destination data, first portion of data, and second portion of data may be implemented as storage device 102, processing circuitry 104, operation queue 105 and system memory 106, volatile memory 108, source memory block 110, destination memory block 112, first volatile memory 114, second volatile memory 116, source data 203, destination data 205, first portion of data 206, and second portion of data 208, respectively. In some embodiments, the subprocess 500 can be modified by, for example, having steps rearranged, changed, added, and/or removed.

At step 502, the processing circuitry transmits a control signal to indicate to an operation queue to hold data change operations within the operation queue but allow for read operations to continue. In some embodiments, prior to initiating garbage collection, the processing circuitry may send an interrupt to the operation queue to pause outstanding data change operations and any further data change operations received during garbage collection. In some embodiments, the interrupt may set the operation queue to only allow passive operations (e.g., read operations and error handling operations) to continue and be processed by the processing circuitry.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments. Further, although process steps, method steps, algorithms or the like may be described in a sequential order, such processes, methods, and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

What is claimed is:

1. A system, comprising:
   system memory comprising a source memory block and a destination memory block each of a memory block size;
   a first volatile memory and a second volatile memory, each of a volatile memory size; and
   processing circuitry communicatively coupled to the system memory, to the first volatile memory, and to the second volatile memory, wherein the processing circuitry comprises an operation queue configured to temporarily store any outstanding data change instructions, read instructions, and error handling instructions, the processing circuitry to receive a garbage collection request associated with the destination memory block, and in response to the garbage collection request, to:
  determine whether the memory block size is greater than the volatile memory size,
  pause execution, by the processing circuitry, of data change operations stored in the operation queue, but allow for execution of read operations and error handling operations stored in the operation queue to continue,
  while execution of data change operations stored in the operation queue is paused and execution of read operations is allowed to continue:
    load a first portion of data associated with the source memory block to the first volatile memory,
    load a second portion of data associated with the source memory block to the second volatile memory, and
    write each of the first portion of data from the first volatile memory and the second portion of data from the second volatile memory to the destination memory block to complete garbage collection, and
  unpause the execution of data change operations stored in the operation queue.

2. The system of claim 1, wherein the first volatile memory and the second volatile memory are segments of a volatile memory, wherein the volatile memory comprises a plurality of segments and each segment of the volatile memory is of the volatile memory size, wherein the processing circuitry is further to:
  load a portion of data associated with the source memory block to each segment of the plurality of segments of the volatile memory.

3. The system of claim 1, wherein the data change operations comprise write operations.

4. The system of claim 1, wherein the processing circuitry is further to transmit a control signal to indicate to the operation queue to hold data change operations within the operation queue but allow for read operations to pass through to the processing circuitry.

5. The system of claim 1, wherein the processing circuitry is further to overwrite previously-stored data of the destination memory block with the first portion of data from the first volatile memory and the second portion of data from the second volatile memory.

6. The system of claim 1, wherein the system memory comprises non-volatile memory, wherein the non-volatile memory comprises any one of the following: Phase Change Memory (PCM), a PCM and switch (PCMS), a Ferroelectric Random Access Memory (FeRAM), or a Ferroelectric Transistor Random Access Memory (FeTRAM), a Memristor, a Spin-Transfer Torque Random Access Memory (STT-RAM), and a Magnetoresistive Random Access Memory (MRAM), and flash memory.

7. The system of claim 1, wherein the first volatile memory and the second volatile memory comprise static random access memory (SRAM).

8. A method, comprising:
  receiving, by processing circuitry of a memory device, a garbage collection request associated with a destination memory block of a system memory of the memory device, and in response to the garbage collection request:
    determining, by the processing circuitry, whether a memory block size of the system memory is greater than a volatile memory size of volatile memory of the memory device,
    pausing execution, by the processing circuitry, of data change operations stored in an operation queue configured to temporarily store any outstanding data change instructions, read instructions, and error handling instructions, but allowing for execution of read operations and error handling operations to continue,
    while execution of data change operations stored in the operation queue is paused and execution of read operations is allowed to continue:
      loading, by the processing circuitry, a first portion of data associated with a source memory block of the system memory to a first volatile memory of the volatile memory,
      loading, by the processing circuitry, a second portion of data associated with the source memory block to a second volatile memory of the volatile memory, and
      writing, by the processing circuitry, each of the first portion of data from the first volatile memory and the second portion of data from the second volatile memory to the destination memory block to complete garbage collection, and
    unpausing execution, by the processing circuitry, of the data change operations stored in the operation queue.

9. The method of claim 8, wherein the first volatile memory and the second volatile memory are segments of a volatile memory, wherein the volatile memory comprises a plurality of segments and each segment of the volatile memory is of the volatile memory size, wherein the method further comprises:
  loading a portion of data associated with the source memory block to each segment of the plurality of segments of the volatile memory.

10. The method of claim 8, wherein the data change operations comprise write operations.

11. The method of claim 8, wherein pausing execution, by the processing circuitry, of data change operations stored in an operation queue, but allowing for execution of read operations and error handling operations to continue comprises transmitting a control signal to indicate to an operation queue to hold data change operations within the operation queue but allow for read operations to continue.

12. The method of claim 8, wherein writing each of the first portion of data from the first volatile memory and the second portion of data from the second volatile memory to the destination memory block to complete garbage collection comprises overwriting previously-stored data of the destination memory block with the first portion of data from the first volatile memory and the second portion of data from the second volatile memory.

13. The method of claim 8, wherein the first volatile memory and the second volatile memory comprise static random access memory (SRAM).

14. A non-transitory computer-readable medium having non-transitory computer-readable instructions encoded thereon that, when executed performs a method comprising receiving a garbage collection request associated with a destination memory block of a system memory, and in response to the garbage collection request:
  determining whether a memory block size of the system memory is greater than a volatile memory size of volatile memory, pausing execution of data change operations stored in an operation queue configured to temporarily store an outstanding data change instructions, read instructions, and error handling instructions, but allowing for execution of read operations and error handling operations to continue, while execution of data change operations stored in the operation queue is paused and execution of read operations is allowed to continue:

loading a first portion of data associated with a source memory block of the system memory to a first volatile memory of the volatile memory, loading a second portion of data associated with the source memory block to a second volatile memory of the volatile memory, and writing each of the first portion of data from the first volatile memory and the second portion of data from the second volatile memory to the destination memory block to complete garbage collection, and unpausing execution of the data change operations stored in the operation queue.

15. The non-transitory computer-readable medium of claim 14, wherein the first volatile memory and the second volatile memory are segments of a volatile memory, wherein the volatile memory comprises a plurality of segments and each segment of the volatile memory is of the volatile memory size, wherein the method further comprises:

loading a portion of data associated with the source memory block to each segment of the plurality of segments of the volatile memory.

16. The non-transitory computer-readable medium of claim 14, wherein the data change operations comprise write operations.

17. The non-transitory computer-readable medium of claim 14, wherein pausing execution of data change operations stored in an operation queue, but allowing for execution of read operations and error handling operations to continue comprises transmitting a control signal to indicate to an operation queue to hold data change operations within the operation queue but allow for read operations to continue.

18. The non-transitory computer-readable medium of claim 14, wherein writing each of the first portion of data from the first volatile memory and the second portion of data from the second volatile memory to the destination memory block to complete garbage collection comprises overwriting previously-stored data of the destination memory block with the first portion of data from the first volatile memory and the second portion of data from the second volatile memory.

19. The non-transitory computer-readable medium of claim 14, wherein the system memory comprises non-volatile memory, wherein the non-volatile memory comprises any one of the following: Phase Change Memory (PCM), a PCM and switch (PCMS), a Ferroelectric Random Access Memory (FeRAM), or a Ferroelectric Transistor Random Access Memory (FeTRAM), a Memristor, a Spin-Transfer Torque Random Access Memory (STT-RAM), and a Magnetoresistive Random Access Memory (MRAM), and flash memory.

20. The non-transitory computer-readable medium of claim 14, wherein the first volatile memory and the second volatile memory comprise static random access memory (SRAM).

* * * * *